United States Patent [19]

Fearnside et al.

[11] Patent Number: 5,020,042

[45] Date of Patent: May 28, 1991

[54] APPARATUS FOR SELECTIVELY INVERTING A MAGNETIC BIAS FIELD USING A ROD-SHAPED PERMANENT MAGNET SURROUNDED WITH AN ELECTRICALLY CONDUCTIVE DAMPING MEANS

[75] Inventors: William T. Fearnside, Fishers; David M. Orlicki, Rochester, both of N.Y.

[73] Assignee: Eastman Kodak Company, Rochester, N.Y.

[21] Appl. No.: 411,973

[22] Filed: Sep. 25, 1989

[51] Int. Cl.$^5$ .................. G11B 13/04; G11B 11/12
[52] U.S. Cl. ...................... 369/13; 360/114; 360/59
[58] Field of Search .................. 369/13; 360/114, 59; 365/122

[56] References Cited

U.S. PATENT DOCUMENTS 4,701,895 10/1987 VanSaint ................... 369/13

FOREIGN PATENT DOCUMENTS 60-226044 11/1985 Japan ....................... 369/13
62-14352 1/1987 Japan ....................... 360/114

Primary Examiner—Stuart S. Levy
Assistant Examiner—Hoa Nguyen
Attorney, Agent, or Firm—Warren W. Kurz

[57] ABSTRACT

Apparatus for selectively reversing a magnetic bias field (e.g., to switch between recording and erasing modes in a magnetooptic recording system) includes a rod-shaped permanent magnet having its magnetic poles oriented along the cross-sectional dimension thereof. The rod is mounted for axial rotation within a concentrically arranged tube of electrically conductive material, and means are provided for biasing the rotational position of the magnet toward either of two nominal positions, 180° apart. Upon being subjected to a torque, the magnet rotates toward either of its nominal positions, and oscillatory movement about such nominal positions is damped by eddy-current-produced magnetic forces in the conductive tube.

7 Claims, 2 Drawing Sheets

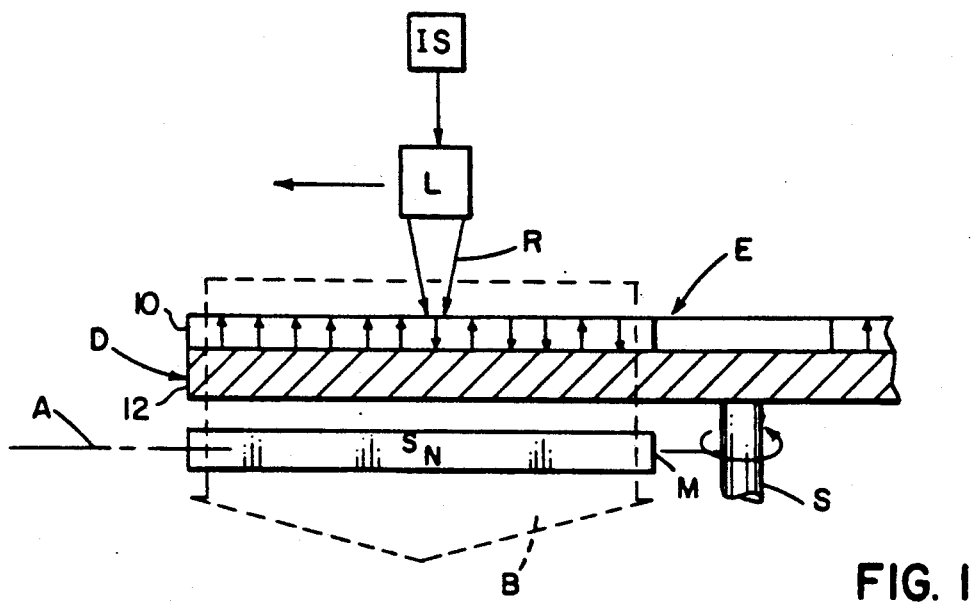
FIG. 1
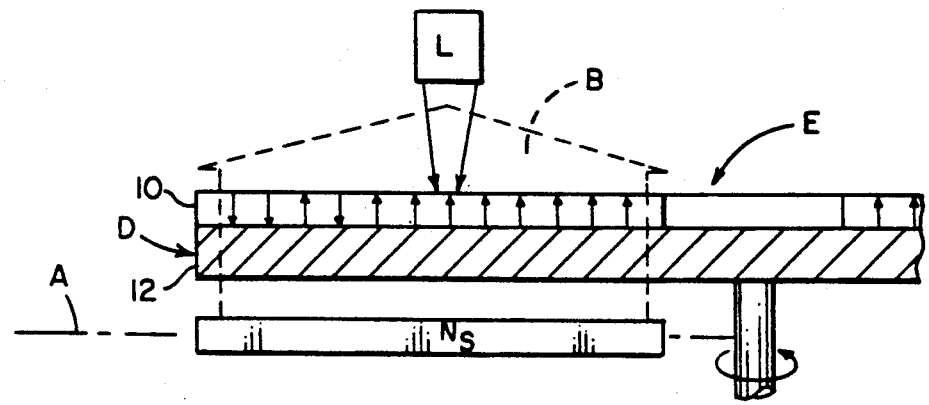
FIG. 2
FIG. 3
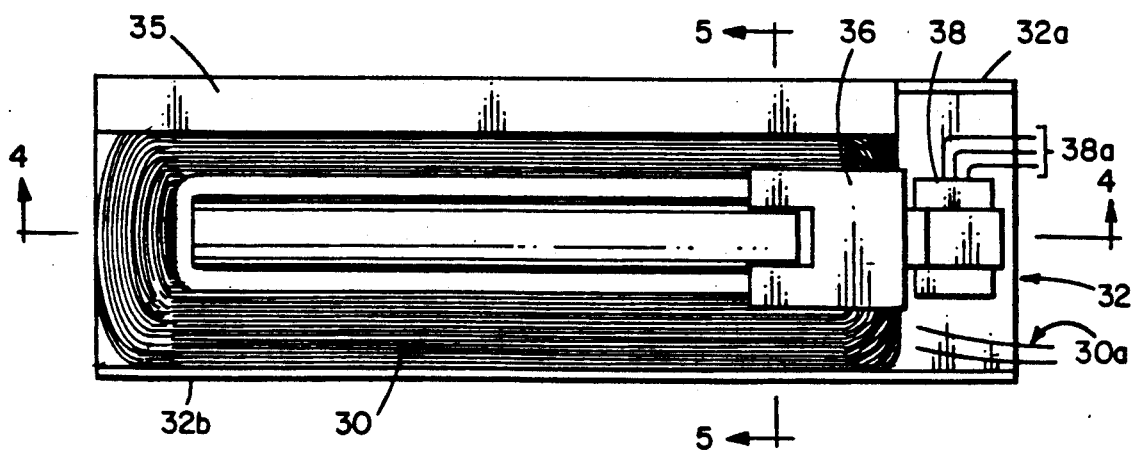

APPARATUS FOR SELECTIVELY INVERTING A MAGNETIC BIAS FIELD USING A ROD-SHAPED PERMANENT MAGNET SURROUNDED WITH AN ELECTRICALLY CONDUCTIVE DAMPING MEANS

BACKGROUND OF THE INVENTION

This invention relates to the field of magneto-optic recording. More particularly, it relates to improvements in apparatus for inverting (i.e. changing the polarity of ) a magentic field through which a magneto-optic recording element passes during the information recording and erasing steps of the magneto-optic recording process.

In the magneto-optic recording process, a vertically magnetizable recording layer is initially sensitized by simultaneously subjecting it to a uniform magnetic field and a temperature which exceeds its Curie temperature (e.g.400° C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, the laser beam intensity is switched between high and low levels, representing the digital (binary) information being recorded. Only the high level is sufficiently intense to raise the temperature of the irradiated portion of the recording layer to above its Curie temperature, thus, digital information is recorded at the point of incidence of the laser as the more intensely irradiated magnetic domains flip in orientation to align themselves with the reverse magnetic bias field. Playback of the recorded information is commonly achieved by scanning the information tracks with a plane-polarized beam of radiation and monitoring the reflected beam for shifts in the plane of polarization, as produced by the well-known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosure of U.S. Pat. No. 4,701,895, for example, a cylindrical permanent magnet is positioned radially with respect to a spinning magneto-optic disk. The poles of the magnet are diametrically opposed, and the magnet is supported for rotation about its longitudinal axis. Circular eddy currents induced by the cylindrical magnet on the surface of the spinning disk, serve to generate a second magnetic field which opposes that of the magnet. As a result, the cylindrical magnet rotates freely about its axis, driven by the eddy current-produced magnetic field on the disk. A mechanism is provided for stopping the rotation of the magnet with one or the other of its poles located adjacent the disk. Depending on the orientation of the permanent magnet, either a recording or erasing magnetic bias field is provided.

In the magnetic field inversion scheme described above, the eddy current-induced magnetic field used to rotate the permanent magnet is relatively weak. Hence, fast a reliable field reversals are not attainable. Moreover, since the amplitude of the eddy currents is dependent on the electrical conductivity of the recording layer, certain types of recording layers may not be useful in producing the required driving force for rotating the magnet.

U.S. Patent No. 4,748,606, discloses various other magnetic field-inverting mechanisms. In all such mechanisms, a multiturn coil is used to flip (by 180°) the orientation of a rotatably supported bar magnet relative to a magneto-optic recording element. The coil surrounds the magnet and, in response to a current pulse being applied to the coil, produces a transient magnetic field tending to repel the field of the permanent magnet. To assure that this transient field applies a rotational force (torque) on the bar magnet, the center of the magnetic field of the bar magnet is displaced with respect to that of the magnetic field winding (coil). Alternatively, the necessary torque is achieved by arranging a ferromagnetic (e.g. iron) strip or auxillary bar magnet along one side of the rotary housing of bar magnet to cause the field of the bar magnet to be slightly inclined, relative to the field of the coil.

While the use of a separate magnetic field winding provides a more positive torque on the permanent magnet than that produced by magnetically-induced eddy currents, the mechanisms disclosed in the '606 patent are disadvantageous in that they require considerable time for the bar magnet to settle to a steady-state position after pole-flipping (i.e., 180° rotation ) has occurred. Since there is no means provided for damping the inherent oscillating movement of the bar magnet about its two nominal positions, the position of the magnet tends to oscillate prior to settling to its nominal position. This oscillation, of course, adversely impacts the rate at which the magneto-optic process can be switched between recording and erase modes. While stop mechanisms, such as disclosed in the '895 patent, could be used to eliminate this oscillation problem, such mechanisms add complexity and cost to the system.

SUMMARY OF THE INVENTION

In view of the foregoing discussion, an object of this invention is to provide a low cost, high torque magnetic field-inverting apparatus in which the above mentioned oscillation problem is effectively eliminated.

The magnetic field-inverting apparatus of the invention comprises an elongated permanent magnet surrounded by a non-magnetic, electrically conductive sleeve or tube. Preferably, the magnet is rotatably mounted within the tube, and the magnet/tube assembly is surrounded by a magnetic field-producing coil. The orientation of the coil relative to the magnet/tube assembly is such that when energized with a current pulse, the coil provides a magnetic field tending to rotate the magnet within its surrounding tube. Eddy currents, produced in the conductive sleeve by the rotation of the permanent magnet therein, produce a secondary magnetic field which acts to resist rotation of magnet, thereby damping the oscillator settling characteristic of the magnet about a nominal, steady state position. Preferably, the magnet is in the form of a cylindrical rod, and the electrically conductive tube is in the form of a hollow cylinder which concentrically surrounds the magnetic rod.

The invention and its various advantages will be better understood from the ensuing detailed description of a preferred embodiment, reference being made to the accompanying drawings.

BRIEF DESCRIPTION OF THE DRAWINGS

FIGS. 1 and 2 schematically illustrate the recording and erasing steps of a magneto-optic recording system;

FIG. 3 is a top plan view of a preferred embodiment of the field-inverting apparatus of the invention;

DETAILED DESCRIPTION OF PREFERRED EMBODIMENTS

Figure 4:
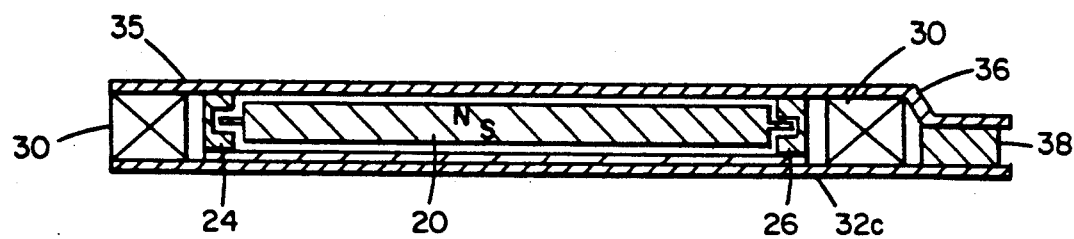
FIGS. 4 and 5 are cross-sectional views of the FIG. 3 apparatus taken along the section lines 4—4 and 5—5, respectively.

Referring to the drawings, FIGS. 1 and 2 schematically illustrate the recording and erasing steps of a magneto-optic recording system. In FIG. 1, a magneto-optic recording element E is shown in the form of a disk D which is adapted to be rotated about is central axis on a spindle S. The essential features of the recording element are a vertically magnetizable recording layer 10 and a supporting substrate 12. Prior to the recording step of FIG. 1, all of the magnetic domains (indicated by the arrows in layer 10) are oriented in the same direction. During the recording step, the recording layer is selectively heated by a beam of radiation R, as provided by a laser source L. The beam intensity is modulated by an information source IS representing certain digital information which is to be recorded. The information source functions to switch the beam intensity of laser L between high and low levels, only the high level being sufficient to heat the recording layer to at least its Curie temperature. An elongated permanent magnet M, radially disposed with respect to the rotating disk, serves to produce a magnetic field B. Magnet M is mounted for rotation about is longitudinal axis so that the direction of the field, B, may be switched from the downward direction, indicated in FIG. 1, to an upward direction, indicated in FIG. 2. When oriented to produce the bias field shown in FIG. 1, the magnet M will cause the magnetic domains in the recording element to flip orientation, from upward to downward, whenever the laser beam intensity is at its high level. In this manner, the digital information provided by source IS is magnetically recorded in layer 10.

To erase the previously recorded information in layer 10, the direction of the magnetic bias field is inverted, as shown in FIG. 2. After such field inversion, laser L scans the recording element while its intensity is maintained at its high level. While so radiated, all of the magnetic domains align themselves with the bias field thereby providing a uniformly sensitized disk or track which is again ready to record information.

Figure 5:
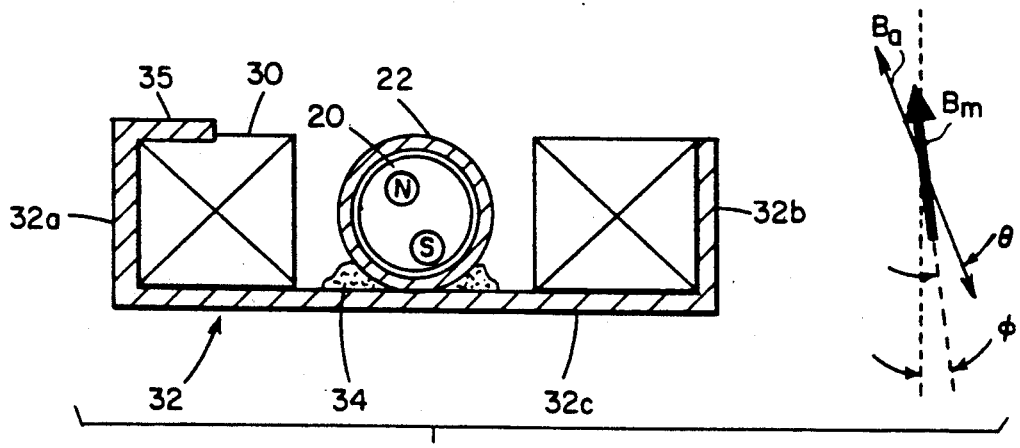

In accordance with the present invention, there is provided a simple, yet reliable, apparatus for rapidly producing the magnetic field inversion required for magneto-optic recording and erasing of information. Referring to FIGS. 3-5, such apparatus comprises a rod-shaped magnet 20 (shown in FIGS. 4 and 5) having its magnetization oriented along its diameter. Magnet 20, which is preferably of circular cross-section, is concentrically arranged within an electrically conductive, non-magnetic, sleeve or tube 22, and is rotatably mounted therein by a pair of bearing supports 24, 26 disposed at opposite ends of the tube. Preferably, tube 22 is made of aluminum, although copper or brass would also be useful materials. Magnet-containing tube 22 is surrounded, in the plane of tube magnet axis A, by a selectively energizable field winding or coil 30. Both the coil and tube/magnet assembly are supported by a tray 32 of ferromagnetic material, preferably steel. Tray 32 has a pair of side walls 32a, 32b between which tube 22 is centered. Tube 22 is attached to the tray base 32c by an adhesive 34 or some other suitable fastener. One end of a formed steel clevis 36 extends over one end of coil 30 and in close proximity to tube 22. The opposite end of clevis 36 contacts a conventional Hall sensor 38 which is affixed to the tray bottom. For reasons explained, a ferromagnetic flange 35, preferably integral with tray side wall 32a, extends inwardly from the top of side walls 32a partially covering a portion of one of the longitudinal legs of coil 30.

Figure 6:
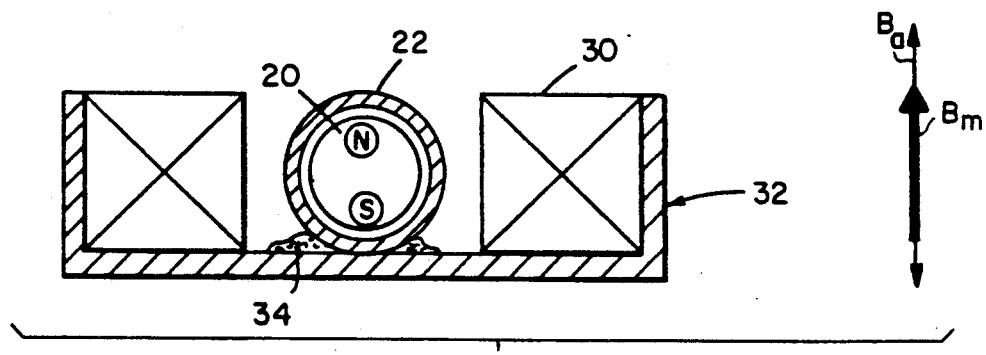
FIG. 6 is an illustration which facilitates an understanding of the operation of the invention.

To facilitate understanding the operation of the apparatus of the invention, consider the structure shown in FIG. 6. This is a simplified version of the cross-sectional view of FIG. 4 in that the steel tray is shown as being symmetric relative to the vertical diameter of the magent, i.e., flange 35 has been eliminated. Since the magnet is free to rotate about its longitudinal axis, its rest position is established by the balance of torques generated by the attraction of the magnetic poles (North and South) to the steel structure. Because of the symmetric geometry of the magnetically attractive structure surrounding the magnet, the magnet will come to rest in a stable position which is either oriented as shown, or in the opposite configuration with the South pole in the up position. The magnetic flux field due to the magnet rod is designated $B_m$ in the force diagram. With no current applied to coil 30, the applied field $B_a$ is zero. When current is applied to the coil, again because of the magnetic symmetry of the tray, $B_a$ will be oriented along the vertical diameter of the magnet with its sense determined by the direction of current flow. A torque $\tau$ exists on the magnet tending to align $B_a$ and $B_m$ in opposite directions and is given by the following equation, where B is defined to be the angle between $B_a$ and $B_m$.

$$\tau = B_a B_m \sin(\theta)$$

With $\theta = 0$ in this configuration, the magnet will not rotate, regardless of the magnitude of the applied field.

Now consider the asymmetric magnetic structure shown in FIG. 4. The additional steel flange 35 over the left coil element as viewed in FIG. 4 alters both the $B_a$ and $B_m$ flux distributions. The additional steel constitutes a significant shortening of the magnetic path around the left half of the coil cross section and results in reorientation of the net $B_a$ vector to the left. The attraction force between the North pole N of the magnet and the steel is increased to the left relative to the right but is still only a small contributor to the force balance which establishes the rest position of the magnet. The South pole is still much closer to the tray bottom and attractive force is roughly inversely proportional to the pole to steel gap. The $B_m$ axis deviates from vertical by an angle $\Phi$ while $B_a$ deviates by some greater angle, $\theta$. The net result is establishment of a nonzero torque angle B which enables rotation of the magnet by energizing the coil, as indicated in the above equation. Current applied to leads 30a in one sense will flip the magnet to its opposite stable state. Current applied in the opposite sense tends to drive $\theta$ zero with the magnet remaining close to its original stable state. When current is removed, the magnet returns to its original state, resulting in no net rotation.

Once a pulse of current has been applied to the coil to flip the magnet, the settling dynamics of the system are determined by the attraction of the downward pole and the tray. The restoring torque applied to the magnet due to the interaction of its poles and the tray is nearly linearly proportional to angular deviation from rest position. The system dynamics are thus the same as a simple spring-mass-damper oscillator with only the friction of the bearings to provide damping. According to this invention, the settling time for the system is greatly improved by the presence of the highly conductive, non-magnetic tube 22 surrounding and in close proximity to the magnet. Rotation of the magnet results in flux lines sweeping across the tube walls, establishing eddy currents in the metal. These eddy currents, in turn, produce a magnetic field which acts to resist rotation of the magnet rod, thereby damping the oscillatory settling characteristic of the system. Note, this is the same principal which is commonly used to dampen the movement of D'Arsonval meter movements. The degree of damping can be precisely controlled by management of tube material selection and magnet rod to tube spacing. Since the tube is chosen non-magnetic, it has no influence on the static behavior of fields due to the magnet rod as they interact with the magneto-optic recording media.

Referring again to FIGS. 3-5. the orientation of magnet 20 is sensed by Hall sensor 38 which is sensitive to the orientation of flux lines diverted from magnet 20 through steel clevis piece 36. The hall sensors output leads 38a provide an unambiguous indication of the polarity of the magnetic field acting on the adjacent MO media so that writing and erasure modes are confirmed before activation of the laser beam.

A working prototype of the above-described apparatus was built and tested. The magnet was in the form of a rod circular cross-section, having a diameter of about 0.145 in and a field strength of 1600 gauss. The magnet was rotatably mounted and concentrically arranged within an aluminum tube having an inside diameter of about 0.1875 in and a wall thickness of 0.0156 in. The coil comprised 600 turns of No. 36 guage copper wire. Upon applying a voltage pulse of 12 volts for 10 milliseconds to the coil, the magnet rotated 180° and settled to steady-state position in approximately 5 milliseconds.

The apparatus was also tested without presence of the aluminum tube. In this case, the settling time increased to more than 100 ms.

The invention has been described in detail with particular reference to certian preferred embodiments thereof, but it will be understood that variations and modifications can be effected within the spirit and scope of the invention.

What is claimed is:

1. Apparatus for selectively inverting an external magnetic field in a magneto-optic recording system so that information can be selectively recorded on or erased from a magneto-optic recording element of said system moving through said field, said apparatus comprising:
   (a) a rod-shaped permanent magnet having its north and south magnetic poles oriented along its cross-sectional dimension;
   (b) means for supporting said magnet for axial rotation;
   (c) means for biasing the rotational position of said magnet within said support toward either of two nominal positions, 180° apart;
   (d) means for exerting a torque on said magnet to cause said magnet to rotate from one nominal position toward the other nominal position; and
   (e) electrically conductive means surrounding said magnet for damping any tendency for the magnet to oscillate about either of said nominal positions.

2. The apparatus as defined by claim 1 wherein said damping means comprises an electrically conductive sleeve surrounding said magnet.

3. The apparatus as defined by claim 1 wherein said means for exerting a torque comprises a selectively energizable coil surrounding said magnet.

4. The apparatus as defined by claim 1 wherein said biasing means comprises ferromagnetic means for attracting one of said poles more than the other, depending on rotational position of said magnet.

5. The apparatus as defined by claim 2 wherein said sleeve is supported by a magnetically-attractive tray, which serves as said biasing means.

6. The apparatus as defined by claim 1 wherein said magnet has a circular cross section.

7. The apparatus as defined by claim 6 wherein said sleeve concentrically surrounds said magnet in close proximity thereto.

* * * * *